Figures 1, 2:
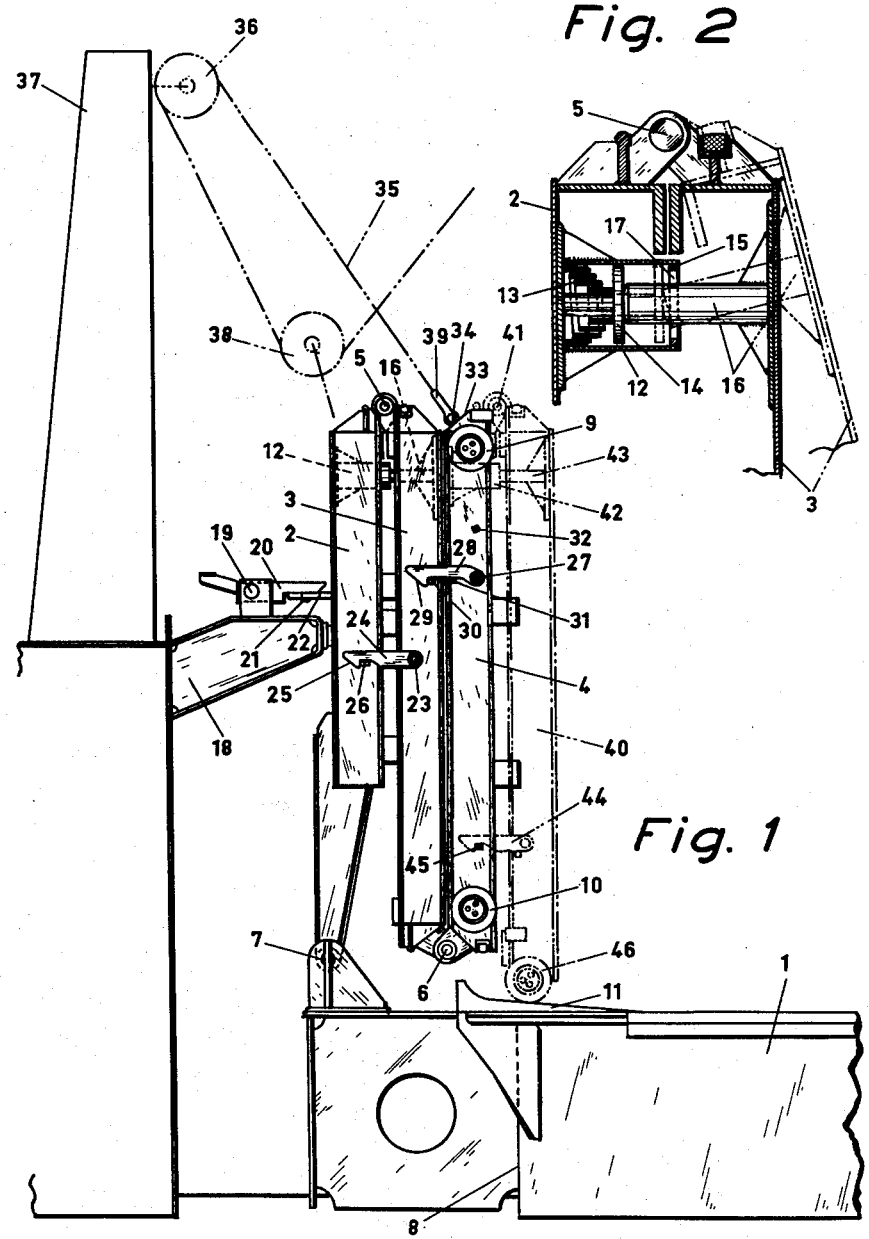

Dec. 17, 1963   C. E. I. DAHLIN   3,114,346
HATCH COVERS
Filed Jan. 13, 1961   2 Sheets-Sheet 1

INVENTOR
Carl Erik Ingemar Dahlin
BY

Dec. 17, 1963    C. E. I. DAHLIN    3,114,346
HATCH COVERS

Filed Jan. 13, 1961    2 Sheets-Sheet 2

INVENTOR
Carl Erich Ingeman Dahlin
BY
ATTY

United States Patent Office 3,114,346
Patented Dec. 17, 1963

3,114,346
HATCH COVERS
Carl Erik Ingemar Dahlin, Goteborg C, Sweden, assignor to Von Tell Trading Co. AB, Goteborg, Sweden, a corporation of Sweden
Filed Jan. 13, 1961, Ser. No. 82,557
Claims priority, application Sweden Feb. 6, 1960
5 Claims. (Cl. 114—202)

This invention has reference to hatch covers of the kind comprising at least three sections being hinged to each other. One of said sections is by means of a shaft hinged to the hatch coaming and this section, in the following denoted the first section, and its adjacent section, denoted the second section, can be opened in such a way that their under surfaces be turned towards each other and the next section, denoted the third section, in opened position has its upper surface positioned towards the upper surface of the second section. Between the first and second sections there is arranged at least one spring element which is adapted to be compressed at the opening up of the hatch sections and by its spring action to swing apart said sections at the closing of the hatch cover.

In a previously known hatch cover of this kind the spring element is arranged around the shaft the latter serving as a hinge. During the whole opening movements of the hatch sections said spring is compressed which means that the opening up of the hatch cover requires an increased force. When the hatch cover is in opened position, the spring is situated unprotected in the slot between adjacent hatch sections and is exposed to mechanic influence as well as to corrosive influence. At loading and discharging of granular material, e.g. coke and the like, pieces of this material can enter between the turns of the spring and thereupon detrimentally affect the function of the spring.

The aim of present invention is to completely overcome said drawbacks and the invention is for this purpose in first line characterised thereby that the spring element or elements are arranged on the under side of the first hatch section and/or the second hatch section at a distance from the hinge between two sections and arranged not to be compressed until at the end of the opening up movement of said sections, the hatch further provided with locking means for releasable retaining of the first section in opened position and with locking means for releasable retaining of the second section against the first section with the spring element in compressed condition.

The main advantage with the invention is that the hatch cover can be easily, simply and rapidly opened up and closed by means of a single traction wire. The spring element on the under side of respective section is well protected against mechanical as well as chemical influence. The opening movement of the hatch sections is not detrimentally prevented. It is only at the end of the opening up movement the spring element is compressed and at this movement the spring element will act as a cushion.

Figure 3:
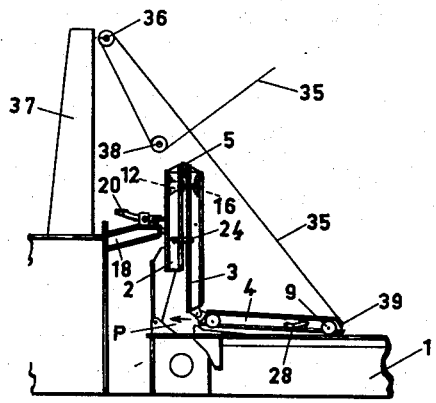
Figure 4:
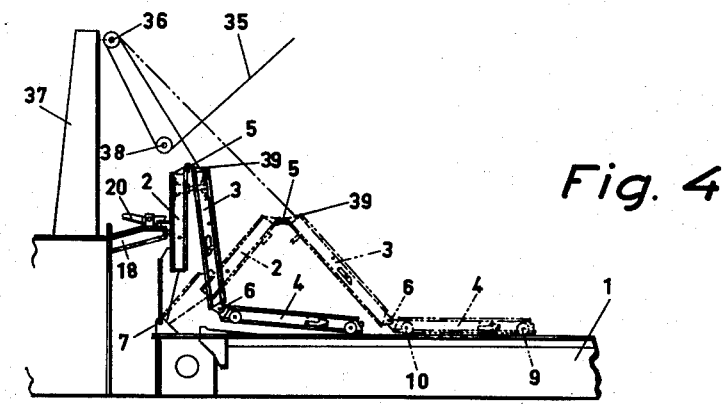
Figure 5:
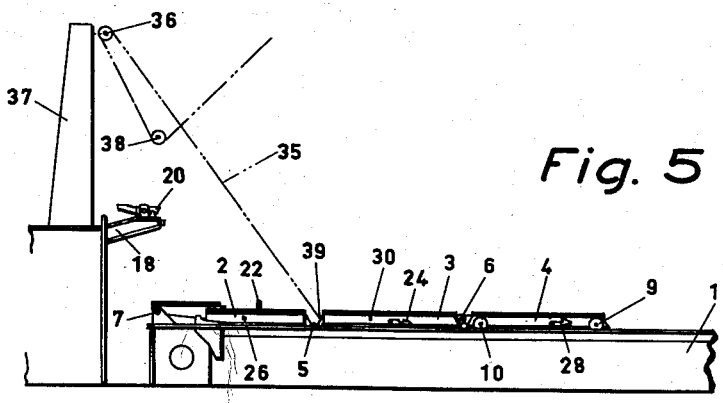

An example of a hatch cover in accordance with the invention will now be described with reference to the accompanying drawings. In the drawings:

FIG. 1 is a vertical side elevation of a hatch cover with three sections in accordance to the invention (a fourth section is also shown with dash and dot lines), FIG. 2 shows on a somewhat enlarged scale a vertical cross section through the first and the second sections in the vicinity of the joint between said two sections, FIGS. 3, 4, and 5 show on a reduced scale different positions of the hatch sections at the opening up and the closing of the hatch cover.

In the drawing 1 denotes the coaming around the hatch way which at least partly is covered by a cover comprising three sections 2, 3, and 4. The sections, of which the section 2 in the following will be referred to as the first section, the section 3 as the second section and the section 4 as the third section, are journalled to each other by means of hinges 5 and 6, the first section 2 being attached to the hatch coaming 1 by means of a hinge shaft 7, which is situated at some distance from the sternly boarder 8 of the hatch coaming. The section 4 is provided with runners 9, 10 which are adapted to roll on the upper side of the hatch coaming 1 at the opening up and the closing of the hatch cover. At the end of the hatch coaming 1 situated adjacent the shaft 7 there are arranged inclining roller paths 11 which also facilitate the opening up of the hatch cover as the rollers 10 can roll down along them.

A cylindrical spring housing 12 is arranged on the under side of the first section 2 and a strong helical spring is arranged in the housing 12. The spring 13 normally keeps a washer 14 pressed against an annular flange 15 on the right hand end of the spring housing 12 according to FIG. 2. The second section 3 is on the under side provided with a piston 16 which is positioned in such a way relatively to the spring housing 12 that when the sections 2 and 3 are opened up (FIGS. 1 and 2), the piston with its free (left) end enters through the opening 17 in the free (right) end of the spring housing and presses the washer 14 inwards while compressing the spring 13.

A safety catch 20 with a hook 21 is journalled on a stationary bracket 18 on the ship above the shaft 7 and about a horizontal bolt 19. The catch 20 with the hook 21 falls at the opening up of the section 2 into a locking fitting 22 on the upper side of said sections and thereby retains said section in opened up position. A similar safety catch 24 is journalled about a bolt 23 on the sides (or at least one of the sides) of the section 3. Said locking catch 24 is provided with a locking catch 25 which falls in behind a projection 26 on the side surface of the section 2 when the section 3 is in its completely opened position so as to retain also this section in its opened position. Finally, also the section 4 is provided with a catch 28 journalled about a bolt 27 and having a locking hook 29 falling in behind a projection 30 on the side surface of the section 3 when the section 4 is in its completely opened position whereby also this section is retained in its opened position. The section 4 is also provided with two locking projections 31 and 32 for limiting the swing movements of the catch 28.

The section 4 is at its free boarder 33 which extends transversally over the hatch way provided with an eye 34 (or a similar device) for releasable engagement with one end of a traction rope or wire 35 running over a delinking pulley 36 on the upper end of the mast 37 and thereupon over a second delinking pulley 38 and further to a winch (not shown).

When the hatch cover shown in FIG. 1 with unbroken lines and having three sections 2, 3 and 4 is to be brought to cover the hatch way the course is the following one. By means of a slight traction in the wire 35 having one end attached to the eye 34, it is possible to swing up the catch 28 and thereby to release the section 4 from the section 3. When thereupon the barrel of the winch is released during braking, the section 4, due to the fact that the vertical line from its center of gravity passes outside (i.e. to the right of) the hinge 6, slowly swings in clockwise direction to the position shown in FIG. 3 in which the roller 9 abuts against the upper surface of the hatch coaming 1. Upon renewed traction in the wire 35 a reacting force P is obtained at the lower boarder of the section 3, said force P swinging said section somewhat in clockwise direction about the hinge 5 while further compressing the spring 13 (FIG. 2). It is hereby rendered possible by swinging up of the catches 20 and 24 to release not only the section 3 from the section 2 but also the section 2 from the bracket 18. When the barrel of the winch again is released and thus the traction in the wire 35 will cease or decrease, the spring 13 swings the section 3 in counter-clockwise direction about the hinge 5 shown in FIG. 4 with unbroken lines (however, the wire 35 then has to be attached to the free end boarder of the section 4). The total gravity of the sections 3 and 4 has as a result that also the section 2 is forced to swing in clockwise direction (cf. the position shown in FIG. 4 with dash and dot lines). While being braked by means of the rope 35, the sections 2, 3, and 4 are allowed to slide to the position shown in FIG. 5 and to completely or partly cover the hatch way.

At the opening up of the cover, the wire attachment 39 is arranged in the vicinity of the hinge 5 between the sections 2 and 3. At traction of the wire 35, the sections 2 and 3 are lifted and the section 4 is with its rollers 9 and 10 moved on the hatch coaming 1 closer to the shaft 7 (cf. the position shown in FIG. 4 with dash and dot lines). When the section 2 is completely opened (shown in FIG. 4 with unbroken lines), the catch 20 falls with its locking hook into the locking fitting 22 and keeps this section in opened position. The wire attachment 39 is thereupon connected to the eye 34 and when the wire 35 again is wound in, the section 4 is swung to the position shown in FIG. 1 while compressing the spring 13 by means of the piston 16. The catch 28 then falls by means of its own gravity with its locking hook 29 behind the projection 30 and the catch 24 is manually swung to a corresponding locking position.

In FIG. 1, there is shown by means of dash and dot lines how, at a hatch cover with four sections, the fourth section 40 is journalled to the third section 4 by means of a hinge 41. In this case also the section 4 is provided with a spring housing 32 with a compressible spring therein, and in the outer end of said housing 42 there engages a piston 43 extending downwards from the lower side of the section 40 in the outer end of said housing 42. The section 40 is also provided with a catch 44 for releasably coupling of said section with the section 4 which has a corresponding locking projection 45. Rollers 46 are arranged on the free end boarder of the section 40.

It is evident that also a hatch cover comprising four sections can be brought to opened and closed position in the same easy and simple way as described in the aforegoing. The only difference is to be seen in the fact that at a hatch cover with four sections, the wire attachment 39 for enabling a release of the section 40 from the section 4 by swinging up the catch 44 must initially be attached to the free end border of the section 40.

The present invention has been described in detail above for purposes of illustration only and is not intended to be limited by this description or otherwise except as defined in the appended claims within the scope of which many modifications could be carried out. The catching means for retaining the cover sections 2, 3, 4, and 40 in opened up position could be constructed in another way than the shown one. The spring housings 12 and 42 may be arranged on the sections 3 and 40 and the pistons 16, 43 then have to be arranged on the sections 2 and 4. After being laid around the delinking pulley 36, the traction wire 35 may if desired extend directly down to a winch on deck, said winch eventually arranged in the vicinity of the hatch coaming. The delinking pulley 38 may eventually be constructed for being attached with its shackle in the vicinity of the hinge 5 between the sections 2 and 3.

What I claim is:

1. In a hatch cover comprising at least three sections, the latter being journalled to each other by means of hinges, one of said sections by means of a hinge shaft connected to the hatch coaming, said section, denoted the first section, and the section situated close to it and denoted the second section, adapted to be folded up in such a way that their under sides be turned towards each other, the following section, denoted the third section, in opened up position situated with its upper side turned towards the upper side of said second section, at least one spring element adapted to be compressed at the opening up of said first and second hatch sections and by its spring action to lower said sections at the closing of the hatch cover, said spring element being arranged on the under side of one of the two sections situated near said hinge shaft at a distance from the hinge between said first and second sections and adapted not to be compressed until at the end of the opening movement of said sections, said hatch cover being provided with catching means for retaining said first section in opened position and with catching means for retaining said second section against said first section with said spring element in compressed position, said spring element comprising a frusto-conical helical spring inserted in a spring housing on the under side of one of said two last mentioned sections, a piston arranged on the under side of the opposite section, said piston having its free end in engagement with an opening in one end of said spring housing during the opening up of the hatch cover while compressing said spring.

2. In a hatch cover comprising at least three sections, the latter being journalled to each other by means of hinges, one of said sections by means of a hinge shaft connected to the hatch coaming, said section, denoted the first section, and the section situated close to it and denoted the second section, adapted to be folded up in such a way that their under sides be turned towards each other, the following section, denoted the third section, in opened up position situated with its upper side turned towards the upper side of said second section, at least one spring element adapted to be compressed at the opening up of said first and second hatch sections and by its spring action to lower said sections at the closing of the hatch cover, said spring element being arranged on the under side of one of the two sections situated near said hinge shaft at a distance from the hinge between said first and second sections and adapted not to be compressed until at the end of the opening movement of said sections, said hatch cover being provided with catching means for retaining said first section in opened position and with catching means for retaining said second section against said first section with said spring element in compressed position, said spring element comprising a frusto-conical helical spring inserted in a spring housing on the under side of one of said two last mentioned sections, a piston arranged on the under side of the opposite section, said piston having its free end in engagement with an opening in one end of said spring housing during the opening up of the hatch cover while compressing said spring, said spring housing and said piston with their axes forming a generally right angle with the under side of the section in question.

3. In a hatch cover comprising four sections, the latter being journalled to each other by means of hinges, one of said sections by means of a hinge shaft connected to the hatch coaming, said section, denoted the first section, and the section situated close to it and denoted the second section, adapted to be folded up in such a way that their under sides be turned towards each other, the following section, denoted the third section, in opened up position situated with its upper side turned towards the upper side of said second section, said fourth section in opened up position situated with its under side turned towards the under side of said third section, at least one frusto-conical, helical, spring element adapted to be compressed at the opening up of said first and second hatch sections and by its spring action to lower said sections at the closing of the hatch cover, said helical spring element being arranged on the under side of one of the two sections situated near said hinge shaft at a distance from the hinge between said first and second sections and adapted not to be compressed until at the end of the opening movement of said sections, said hatch cover being provided with catching means for retaining said first section in opened position and with catching means for retaining said second section against said first section with said spring element in compressed position, a further frusto-conical helical spring element arranged between said third and fourth sections, last mentioned spring element having the same effect as the first mentioned spring element situated between said first and second sections, a cylindrical housing extending outward in a direction substantially perpendicular to each of said sections, an annular flange closing the outer end of said cylindrical housing, said frusto-conical helical spring being located within said housing, a disk urged outward by said spring toward said annular flange, said disk being forced toward the spring by a plunger attached to the adjoining section, thereby comprising the spring upon final raising of the adjoining pair of sections into the open substantially vertical position, catching means arranged for retaining said fourth section against said third section while said spring element between said third and fourth sections is compressed.

4. A hatch cover for a hatch having a coaming and a stationary bracket behind and above the rear edge of said coaming, said hatch cover comprising, in combination, at least a first section, a second section, and a third section, a first hinge having a hinge shaft disposed behind and above said first section in a closed position, said first hinge pivotally securing said first section relative to said coaming, a second hinge having an axis disposed below said first and second sections in a closed position, said section hinge pivotally joining said first and second sections, a third hinge having an axis above said second and third sections in a closed position, said third hinge pivotally joining said second and third sections, first and second rollers disposed on the front and back of the sides of said third section rolling on top of the sides of said coaming, first latch means on said stationary bracket engaging said first section and holding said first section in a vertical position in front of said hinge shaft of said first hinge, second latch means securing said second section in a vertical position to said first section, third latch means securing said third section in a vertical position to said second section, compression spring means extending between the bottom surfaces of said second and said first sections when said first and second sections are in the open vertical position, said compression spring means comprising a rigid plunger fixed to extend downward from one section, a cylindrical housing extending downward from another section, an annular flange closing the lower end of said housing, a helical spring within said housing, and a disk urged outward by said helical spring towards said annular flange, said disk being forced inwards by said plunger compressing said spring upon the final raising of said first and second sections into vertical open positions, and winch cable attachment means on the forwardly and upwardly disposed edges of said first and said third sections.

5. A hatch cover for a hatch having a rectangular coaming and a stationary bracket behind and above the rear edge of said coaming, said hatch cover comprising, in combination, a first section having a rearward extension, a second section, a third section, and a fourth section, a first hinge having a hinge shaft disposed behind and above said first section when said first section is in a closed position, said first hinge pivotally securing said extensions of said first section behind said coaming, a second hinge having an axis disposed below said first and said second sections when said first and second sections are in a closed position, said second hinge pivotally joining said first and second sections, a third hinge having an axis above said second and third sections when said second and third sections are in the closed position, said third hinge pivotally joining said second and third sections, a fourth hinge having an axis below said third and fourth sections when said third and fourth sections are in the closed position, said fourth hinge pivotally joining said third and fourth sections, first and second rollers disposed on the front and back of the sides of said third section rolling on the top sides of said coaming, first latch means on said stationary bracket engaging said first section and holding said first section in a vertical open position in front of said hinge shaft of said first hinge, second latch means securing said second section in a vertical position to said first section, third latch means securing said third section in a vertical position to said second section, fourth latch means securing said fourth section in a vertical position to said third section, inclined roller paths extending upward from the sides of said coaming at least even with the rear edge of said coaming, third rollers on the forwardly disposed ends of the sides of said fourth section, said third rollers rolling on the top sides of said hatch coaming and up said inclined roller paths when said fourth section is raised to a vertical open position, compression spring means extending between the bottom surfaces of said first and second sections and said third and fourth sections when said first and second sections and said third and fourth sections are in the open vertical position, said compression spring means each having a rigid plunger fixed to extend downward from one of said sections, a cylindrical housing extending downward from another of said sections, annular flange closing the lower end of said cylindrical housing, a helical spring within said housing, and a disk urged outward by said spring toward said annular flange, said disk being forced inward by said plunger compressing said spring upon the final raising of said sections into an open vertical position, and winch cable attachment means on the forwardly and upwardly disposed edges of said first and third sections.

References Cited in the file of this patent

UNITED STATES PATENTS

| | | |
|---|---|---|
| 2,553,269 | Oldofredi | May 15, 1951 |
| 2,918,122 | Appleton et al. | Dec. 22, 1959 |

FOREIGN PATENTS

| | | |
|---|---|---|
| 655,199 | Great Britain | July 11, 1951 |
| 1,055,573 | France | Oct. 14, 1953 |
| 83,079 | Denmark | July 1, 1957 |
| 787,770 | Great Britain | Dec. 18, 1957 |